United States Patent
Hartinger

(10) Patent No.: US 7,532,976 B2
(45) Date of Patent: May 12, 2009

(54) METHOD OF DETERMINING THE USE OF AT LEAST ONE TOLL ROAD SECTION

(75) Inventor: Horst Hartinger, Feldbach (AT)

(73) Assignee: Siemens AG Osterreich, Vienna (AT)

( * ) Notice: Subject to any disclaimer, the term of this patent is extended or adjusted under 35 U.S.C. 154(b) by 824 days.

(21) Appl. No.: 11/077,940

(22) Filed: Mar. 11, 2005

(65) Prior Publication Data

US 2005/0216187 A1    Sep. 29, 2005

(51) Int. Cl.
*G01C 21/00* (2006.01)
(52) U.S. Cl. ........................ 701/207; 705/417; 705/400; 340/928; 340/932.2
(58) Field of Classification Search ................. 349/928, 349/905, 988–989; 701/207, 213; 235/384; 705/13, 400, 417; 340/989, 928, 932.2
See application file for complete search history.

(56) References Cited

U.S. PATENT DOCUMENTS

| | | | | |
|---|---|---|---|---|
| 4,515,994 A * | 5/1985 | Bolle et al. | ............... | 455/556.1 |
| 4,829,445 A * | 5/1989 | Burney | ........................ | 700/230 |
| 5,310,999 A * | 5/1994 | Claus et al. | .................. | 235/384 |
| 5,717,389 A * | 2/1998 | Mertens et al. | ............. | 340/928 |
| 5,857,152 A | 1/1999 | Everett | | |
| 5,933,114 A | 8/1999 | Eizenhofer et al. | | |
| 6,124,810 A * | 9/2000 | Segal et al. | .................. | 340/994 |
| 6,225,944 B1 * | 5/2001 | Hayes | ...................... | 342/357.1 |
| 6,278,935 B1 * | 8/2001 | Kaplan et al. | ............... | 701/200 |
| 6,377,993 B1 * | 4/2002 | Brandt et al. | ............... | 709/227 |
| 6,463,384 B1 * | 10/2002 | Kaplan et al. | ............... | 701/200 |
| 6,603,843 B1 * | 8/2003 | Hagemann | .................. | 379/111 |
| 6,705,521 B1 * | 3/2004 | Wu et al. | ...................... | 235/384 |
| 6,744,383 B1 * | 6/2004 | Alfred et al. | ................. | 340/988 |

(Continued)

FOREIGN PATENT DOCUMENTS

AU    2003297567 A1 *    4/2004

(Continued)

OTHER PUBLICATIONS

Josifovska, Svetlana, "Pay As You Drive," Electronics Weekly, vol. 1733, No. 13, Aug. 9, 1995 (cited by others).*

(Continued)

*Primary Examiner*—Cuong H Nguyen
(74) *Attorney, Agent, or Firm*—Anton P. Ness; Fox Rothschild LLP

(57) ABSTRACT

A method of, and a toll-collecting system (SYS) for, determining whether at least one toll road section is being used by a vehicle (FAR), wherein the position of the vehicle (FAR) is determined by means of at least one position calculating system (POS) and the determined position is implemented to ascertain whether the road section being used is a toll road section, and wherein the vehicle (FAR) has, in addition to said position calculating system, a transmitter/receiver unit (SEE) that is adapted to exchange data (DAT) with a cellular radio network (FUN), and that to each cell (ZEL) of the radio network (FUN) at least one cell identifier (ZID) is assigned, and when there is at least partial failure of the position calculating system (POS) the at least one cell ID (ZID) is implemented to ascertain whether the road section being used by said vehicle (FAR) is a toll road section.

21 Claims, 3 Drawing Sheets

U.S. PATENT DOCUMENTS

| | | | | |
|---|---|---|---|---|
| 6,959,282 | B2* | 10/2005 | Kakihara et al. | 705/13 |
| 7,006,915 | B2* | 2/2006 | Quartier | 701/207 |
| 7,187,278 | B2* | 3/2007 | Biffar | 340/539.13 |
| 7,251,558 | B1* | 7/2007 | McGrath | 701/117 |
| 7,324,017 | B2* | 1/2008 | Hartinger | 340/989 |
| 7,407,097 | B2* | 8/2008 | Robinson et al. | 235/384 |
| 7,472,019 | B2* | 12/2008 | Hara | 701/201 |
| 2002/0169544 | A1* | 11/2002 | Hashida | 701/207 |
| 2004/0263356 | A1* | 12/2004 | Wu et al. | 340/928 |
| 2005/0107946 | A1* | 5/2005 | Shimizu et al. | 701/207 |
| 2005/0216187 | A1* | 9/2005 | Hartinger | 701/207 |
| 2006/0053496 | A1* | 3/2006 | Ting et al. | 800/3 |
| 2006/0105795 | A1* | 5/2006 | Cermak et al. | 455/518 |
| 2008/0040023 | A1* | 2/2008 | Breed et al. | 701/117 |
| 2008/0162036 | A1* | 7/2008 | Breed | 701/207 |

FOREIGN PATENT DOCUMENTS

| | | | |
|---|---|---|---|
| BR | 200314157 A | * | 7/2005 |
| CA | 2 390 352 A1 | | 4/2000 |
| DE | 43/44433 | | 12/1993 |
| DE | 50306213 G | * | 2/2007 |
| EP | 1537540 A1 | * | 6/2005 |
| IN | 200500240 P3 | * | 9/2005 |
| JP | 2006506695 W | * | 2/2006 |
| WO | WO 95/20801 | | 8/1995 |
| WO | WO 96/42179 | | 12/1996 |
| WO | WO 98/34199 | | 8/1998 |
| WO | WO 99/33027 | | 7/1999 |
| WO | WO 2004025573 A1 | * | 3/2004 |

OTHER PUBLICATIONS

Dick Schnacke, "The 5.9 GHZ DSRC Prototype Development Program", IBTTA Technology Workshop, Madrid, Spain, Nov. 14, 2004, (37 pages). cited by other.*

"Overview of Meeting Proceedings", 2004 IBTTA Technology Committee, Spring Technology Workshop, Miami, Florida, USA, (4 pages). cited by other.*

A Vision for Supporting Autonomous Navigation in Urban Environments; Srini, V.P.; Computer, vol. 39, Issue 12, Dec. 2006 pp. 68-7; Digital Object Identifier 10.1109/MC.2006.407.*

Navigation Using Environmental Constraints; Ji, Yiming; Consumer Communications and Networking Conference, 2009. CCNC 2009. 6th IEEE Jan. 10-13, 2009 pp. 1-5; Digital Object Identifier 10.1109/CCNC.2009.4784930.*

Research on Intelligent Transportation System Technologies and Applications; Luo Qi; Power Electronics and Intelligent ransportation System, 2008. PEITS '08. Workshop on; Aug. 2-3, 2008 pp. 529-531; Digital Object Identifier 10.1109/PEITS.2008.124.*

J. Borkowski and ukka Lempi ainen, "Practical network-based techniques for mobile positioning in umts," EURASIP Journal on Applied Signal Processing, vol. Article ID 12930, pp. 1-15, 2006.*

M. Youssef, A. Youssef, C. Rieger, U. Shankar, and A. Agrawala, "Pinpoint: An asynchronous time-based location determination system," in MobiSys 2006: Proceedings of the 4th international conference on Mobile systems, applications and services, New York, NY, USA: ACM Press, 2006, pp. 165-176.*

M. Chen, T. Sohn, J. Hightower, T. Sohn, A. LaMarca, I. Smith, D. Chmelev, J. Hughes, and F. Potter, "Practical Metropolitan-Scale Positioning for GSM Phones," In Proceedings of Ubicomp, 2006.*

P. Bonnifait, M. Jabbour, and G. Dherbomez, "Real-time implementation of a gis-based localization system for intelligent vehicles," EURASIP J. Embedded Syst., vol. 2007, No. 1, pp. 4-4, 2007.*

Y. Ji, G. Sproul, and S. Biaz., "FreeMobility: Dynamic Localization using GIS," in IEEE Wireless Communications and Networking Conference (WCNC'08), Las Vegas, USA, Mar. 31-Apr. 3, 2008.*

An RFID-Enabled Road Pricing System for Transportation; Porter, J.D.; Kim, D.S.; Systems Journal, IEEE, vol. 2, Issue 2, Jun. 2008 pp. 248-257; Digital Object Identifier 10.1109/JSYST.2008.921287.*

A Roadside ITS Data Bus Prototype for Intelligent Highways; Cai, H.; Lin, Y.; Intelligent Transportation Systems, IEEE Transactions on; vol. 9, Issue 2, Jun. 2008 pp. 344-348; Digital Object Identifier 10.1109/TITS.2008.922873.*

Analysis of DSRC Service Over-Reach inside an Arched Tunnel; Gilbert Siy Ching; Ghoraishi, M.; Lertsirisopon, N.; Takada, J.-i.; Sameda, I.; Sakamoto, H.; Imai, T.; Selected Areas in Communications, IEEE Journal on; vol. 25, Issue 8, Oct. 2007 pp. 1517-1525; Digital Object Identifier 10.1109/JSAC.2007.071003.*

Policy issues for the future intelligent road transport infrastructure; M.G.H. Bell; Intelligent Transport Systems, IEE Proceedings vol. 153, Issue 2, Jun. 2006 pp. 147-155.*

Global pose localization of an autonomous wheeled mobile robot by fusing active RFID and ranging laser scanner: A fuzzy extended information filtering approach; Hung-Hsing Lin; Ching-Chih Tsai; Yi-Yu Li; SICE Annual Conference, 2008; Aug. 20-22, 2008 pp. 2956-2961; Digital Object Indentifier 10.1109/SICE.2008.4655169.*

Vehicle Localization in Vehicular Networks; Parker, R.; Valaee, S.; Vehicular Technology Conference, 2006. VTC-2006 Fall. 2006 IEEE 64th; Sep. 25-28, 2006 pp. 1-5; Digital Object Identifier 10.1109/VTCF.2006.557.*

Quantitative Measures for GPS Based Road User Charging; Feng, Shaojun; Ochieng, Washington; North, Robin; Intelligent Transportation Systems, 2008. ITSC 2008. 11th International IEEE Conference on; Oct. 12-15, 2008 pp. 495-500; Digital Object Identifier 10.1109/ITSC.2008.4732640.*

Research of OBU in ETC Based on ARM; Sun Fukang; Fang Qiansheng; Meng Hao; Wireless Communications, Networking and Mobile Computing, 2008. WiCOM '08. 4th International Conference on; Oct. 12-14, 2008 pp. 1-4; Digital Object Identifier 10.1109/WiCom.2008.700.*

The Research and Application of RFID Technologies in Highway's Electronic Toll Collection System; Guangxian Xu; Wireless Communications, Networking and Mobile Computing, 2008. WiCOM '08. 4th International Conference on; Oct. 12-14, 2008 pp. 1-4; Digital Object Identifier 10.1109/WiCom.2008.692.*

Research of OBU in ETC Based on ARM; Sun Fukang; Fang Qiansheng; Meng Hao; Wireless Communications, Networking and Mobile Computing, 2008.WiCOM '08. 4th International Conference on; Oct. 12-14, 2008 pp. 1-4; Digital Object Identifier 10.1109/WiCom.2008.700.*

A statistical approach to map matching using road network geometry, topology and vehicular motion constraints; Pink, Oliver; Hummel, Britta; Intelligent Transportation Systems, 2008. ITSC 2008. 11th International IEEE Conference on; Oct. 12-15, 2008 pp. 862-867; Digital Object Identifier 10.1109/ITSC.2008.4732697.*

Traffic Estimation and Prediction Based on Real Time Floating Car Data; de Fabritiis, Corrado; Ragona, Roberto; Valenti, Gaetano; Intelligent Transportation Systems, 2008. ITSC 2008. 11th International IEEE Conference on; Oct. 12-15, 2008 pp. 197-203; Digital Object Identifier 10.1109/ITSC.2008.4732534.*

International Search Report mailed Dec. 22, 2003.

Office Action dated May 13, 2008; Canadian Application No. 2499262 (3 pages).

* cited by examiner

REF

| ABS | KOO | ZID | GEW | ZID | GEW | |
|-----|-----|-----|-----|-----|-----|---|
| AB1 | POS1 | ZID1 | 3 | ZID2 | 4 | |
| AB2 | POS2 | ZID8 | 2 | ZID9 | 5 | |
| AB3 | · | · | · | · | · | |
| AB4 | · | · | · | · | · | |
| · | · | · | · | · | · | |
| · | · | · | · | · | · | |

Fig. 3

METHOD OF DETERMINING THE USE OF AT LEAST ONE TOLL ROAD SECTION

CROSS-REFERENCE TO RELATED APPLICATION

This application claims priority from PCT Application Serial No. PCT/AT2003/000266, filed Sep. 9, 2003, which claims priority from Austrian Patent Application No. A 1374/2002 filed Sep. 12, 2002.

FIELD OF THE INVENTION

The invention relates to a method of detecting whether at least one toll road section is being used by a vehicle, in which at least one position calculating system is employed to determine the position of the vehicle and the determined position is implemented to check whether the road section being used is in a toll road section.

The invention further relates to a toll-collecting system comprising at least one position-calculating system adapted to ascertain the position of a vehicle, in which the vehicle has a road-identifying unit adapted to check, at least with reference to the positions detected, whether the road section being used is a toll road section.

BACKGROUND OF THE INVENTION

A toll-collecting system and a method of the aforementioned type are disclosed in DE 43 44 433 A1. In this prior method, the current local coordinates are registered by means of a GPS receiver and compared with coordinates of the access and exit points of a highway road section as internally stored in an electronic vignette and, when the coordinates agree, they are transmitted by way of the digital mobile network to an accounting center outside the vehicle, in which accounting center the transmitted data are used to compute the number of highway kilometers traveled and the highway fees thus due.

WO 95/20801 discloses a method of, and system for, determining toll fees for traffic routes and/or traffic areas in which the positional data of the vehicle are registered by means of a satellite-aided position calculating system and are compared with the position of virtual toll-collecting points. The positional data can be transmitted to a master station outside the vehicle for computation of the toll fees, or computation of the charges can alternatively take place in a toll-charging device inside the vehicle and the calculated charges then be transmitted to the master station, where they can be deducted from an account.

WO 99/33027 describes a method of collecting toll fees, in which the current position of the vehicle is determined by means of a satellite-aided position calculating system and is compared with the position of a virtual toll-collecting point for the purpose of computing toll fees, and when a vehicle passes through a physical toll station, a communication connection is set up between the vehicle and a central master toll station for the purpose of paying the accrued toll fees. After the payment transaction has been carried out, a communication connection is set up between the toll station and the vehicle, via which a message confirming the correct payment of the toll fee is transmitted.

The known methods suffer from the drawback that when the position calculating system used, for example, the GPS system, fails, position computation can no longer take place. In such a case, the effectiveness of toll charging using the prior tolling systems can no longer be guaranteed.

It is therefore an object of the invention to overcome the aforementioned drawbacks.

This object is achieved, according to the invention, with a process of the type mentioned above in that the vehicle is equipped with a transmitter/receiver unit that is adapted to exchange data with a cellular radio network, in which at least one cell identifier is assigned to each cell of the radio network, and when there is at least partial failure of the position calculating system, the measured cell IDs are checked to ascertain whether the road section being used by the vehicle is a toll road section.

Due to the possibility of determining whether a used road section requires toll payment by means of data exchange with a radio network, correct toll charging can still be guaranteed when the primary (eg, satellite-aided) position calculating system fails. By a primary position-calculating system we mean, in this document, any conventional position-calculating system by means of which the position of a vehicle can be determined under normal operating conditions.

In a preferred variant of the invention, at least two cells of the radio network are assigned to a toll road section.

Conveniently, cell identification is continuously measured in the transmitter/receiver unit of the vehicle. Advantageously, the radio network is a GSM network, whilst the primary position-calculating system can be satellite-aided as is the case, for example, in a GPS system.

Other advantages can be achieved by weighting each cell assigned to a toll road section by a weight characteristic of the relevance of this cell for the recognition of the toll road section.

For identification of a toll road section, the sum of the weights of at least two cells assigned to this road section and received in the transmitter/receiver unit can be formed, and when a predefined threshold value of the sum of said weights is exceeded, the currently used road section is classified as being a toll road section.

Conveniently, the weight of a cell corresponds to not more than the maximum number of cells assigned to the toll road section.

Furthermore, the number of currently traversed cells assigned to a toll road section can be counted with reference to the cell IDs received by the transmitter/receiver unit and the count will be checked to ascertain whether a predefined number of traversed cells has been exceeded.

Furthermore, a check can be made to ascertain whether at least two successive cell IDs received by the transmitter/receiver unit are assigned to the same toll road section.

A system based on vehicle localization is particularly suitable for carrying out the method of the invention, for example a toll-collecting system of the type mentioned above in which the road section identifying unit has, in addition to the position-calculating unit, a transmitter/receiver unit that is adapted to exchange data with a cellular radio network, in which at least one cell identifier is assigned to each cell of the radio network and the road section identifying unit is adapted in such a manner that when there is at least partial failure of the position calculating system the at least one cell ID is checked to ascertain whether the road section being used by the vehicle is a toll road section.

In the toll-collecting system of the invention at least one cell of the radio network can be assigned to a toll road section, and the system can be adapted to transmit cell IDs to the transmitter/receiver unit of the vehicle.

Conveniently, the radio network is a GSM network.

Other advantages can be achieved if the position-calculating system is satellite-aided, which position-calculating system is preferably a GPS system.

The road section identifying unit can be adapted, when using the primary position calculating system, to weight each cell assigned to a toll road section with a weight characteristic of the relevance of this cell for the recognition of the toll road section.

Furthermore, for the purpose of identifying a toll road section, the road section identifying unit can be adapted to form the sum of the weights of at least two cells assigned to said road section.

Additionally, the road section identifying unit can be adapted to classify the currently used road section as being a toll road section when a predefined threshold value of the sum of the weights is exceeded.

In an advantageous variant of the invention, the road section identifying unit can be adapted to count the number of the currently traversed cells assigned to a toll road section with reference to the cell IDs received by the transmitter/receiver unit and to check whether a predefined number of traversed cells has been exceeded.

In order to determine a toll road section, the road section identifying unit can be adapted to check whether at least two cell IDs successively received by the transmitter/receiver unit are assigned to the same toll road section.

BRIEF DESCRIPTION OF THE DRAWINGS

The invention and further advantages thereof are explained in greater detail below with reference to some non-restricting embodiments illustrated in the drawings, in which:

FIG. 3 shows a list of georeference data for the identification of a toll road section by means of cell identifying data in a radio network.

DETAILED DESCRIPTION OF THE PRESENT INVENTION

Figure 1:
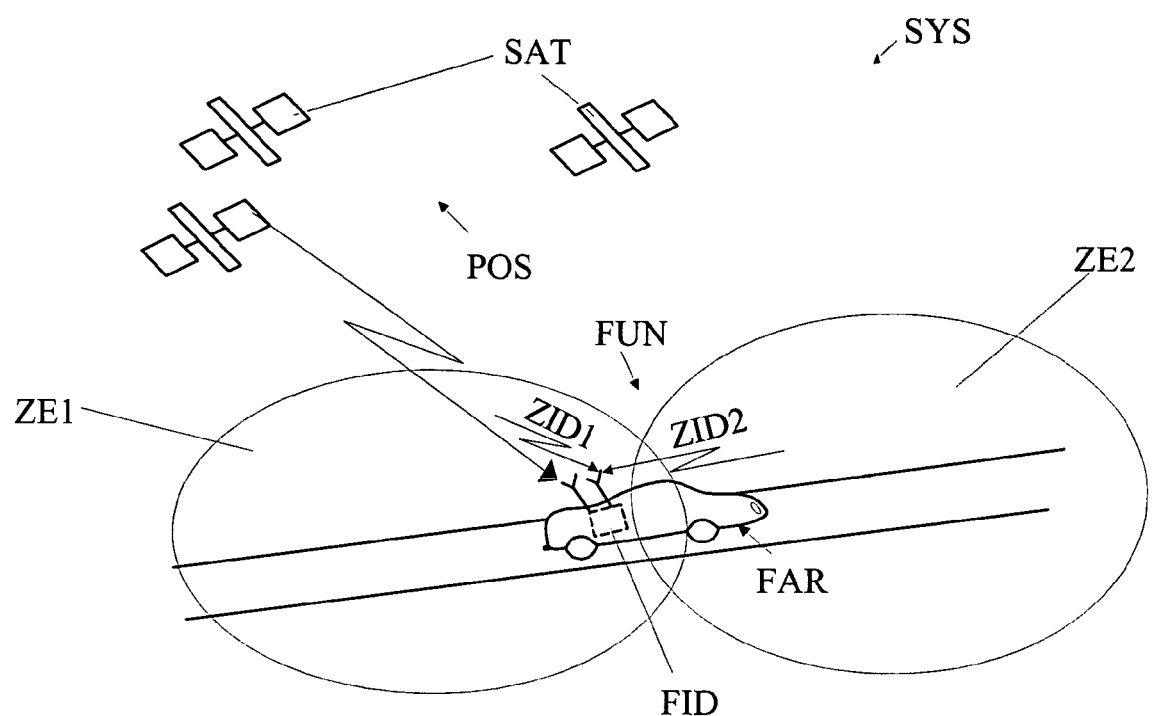
FIG. 1 shows a toll-collecting system of the invention.

According to FIG. 1, a toll-collecting system of the invention SYS has a position-calculating system, for example, a satellite-aided system SAT such as the well known Global Positioning System or briefly GPS system, for determining the current position of a vehicle FAR. Based on the current positions determined by the position-calculating system, a road section identifying unit FID will check whether the currently used road section is a toll road section. Such devices and methods are known per se, for example, as disclosed in DE 43 44 433 A1.

Figure 2:
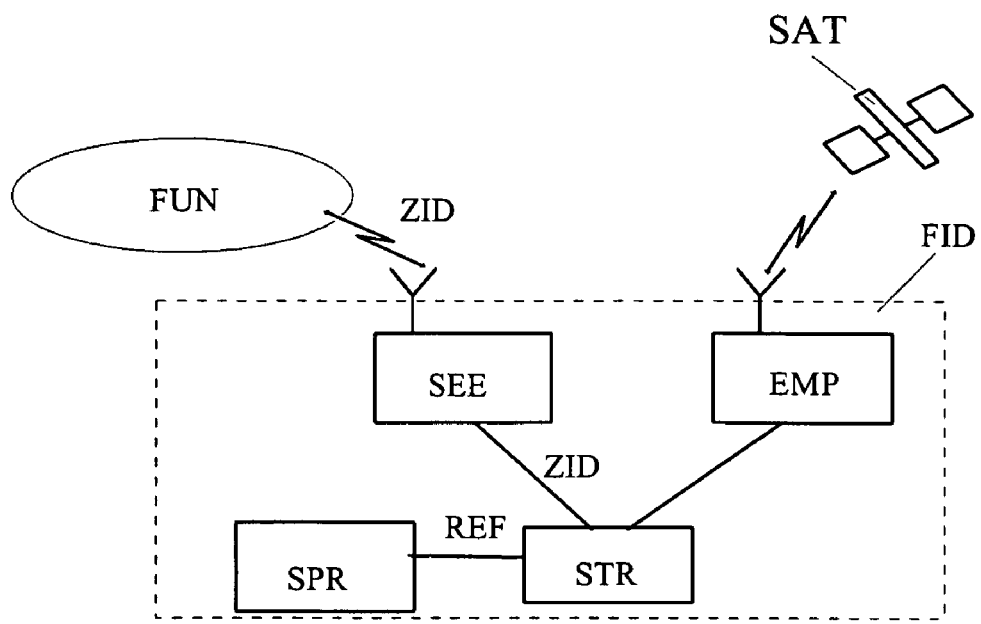
FIG. 2 shows the toll-collecting system of FIG. 1 in greater detail.

Additionally, the road section identifying unit FID has a transmitter/receiver unit SEE, by means of which it can exchange data, particularly cell IDs ZID1, ZID2, with a radio network FUN composed of cells ZE1, ZE2, for example, a GSM network known per se, and also a receiver unit EMP for receiving data from the position calculating system POS, for example, a GPS module (FIG. 2). Furthermore, the road section identifying unit FID has, as shown in FIG. 2, control means STR that communicate with the transmitter/receiver unit SEE allotted to the radio network and with the receiver unit EMP allotted to the position-calculating system POS.

The invention is described below with reference to the GSM network and the GPS system without confining its scope thereto.

GSM sector data do not usually contain positional information concerning the coordinates of a GSM telecommunication terminal device in a GSM network but only information relating to a GSM base station in whose reception area the GSM terminal equipment is currently located.

Since the geographical positions of the base stations are generally not known precisely or even approximately, the GSM data will not be able to provide either exact or approximate locating information.

Due to the low granularity of GSM cells, a position computed from GSM data cannot be compared with the coordinates of access points and highway road sections as are usually obtained when using the position calculating system.

Vehicle localization by way of GSM data can take place, however, on the basis of a priori defined reference data REF containing no positional information but allocations of the GSM data to toll road sections. In order to ensure that localization can be effected irrespective of GSM network operators, such allocations must be realized either via data already present in the network or via an association of the GSM data with the data supplied by the position-calculating system.

There is no validity indicator for GSM data. Current GSM information can thus always be regarded as being valid. The GSM data are used as such as information, and the intensity with which they are received and the duration of reception are not taken into account. Since the dispersion of the GSM cells is usually relatively large, single missing measurements of the GSM data present no problems.

The GSM data comprise, as the most important data for the present invention, a cell ID ZID, ZID1, ZID2, and the "cell ID" and "Location Area Code of that cell ZE1, ZE2 into which the transmitter/receiver unit SEE of the road section identifying unit FID is currently logged. If the transmitter/receiver unit SEE is, for example, a Siemens MC35 modem, this information can be downloaded by the command AT^MONI.

The most important parameters are in this case the cell ID ZID and the Local Area Code. This identification can be continuously transmitted from the transmitter/receiver unit SEE to the control unit STR of the road section identifying unit FID According to FIG. 3, the georeference data REF for secondary localization—the ascertainment effected by the invention using the GSM data as to whether the vehicle FAR is currently on a toll road section or not is referred to below as "secondary localization"—embrace each region ABS, AB1, AB2, AB3, AB4 of the toll road network. The ascertainment as to whether the vehicle FAR is currently on a toll road section as provided by the position calculating system known per se is referred to below as "primary localization".

For each of the toll regions, the georeference data REF provided by the secondary localization contain a predefined number of cell IDs ZID1-ZID9, for example, five cell IDs per region AB1-AB4, the associated Local Area Code (LAC) thereof, the weights GEW of the cell IDs ZID1-ZID9 and additionally a "tunnel variable" indicating the loss to be expected in the primary localization system by the occurrence of a tunnel. The essential information representing a toll road section, is thus the cell IDs ZID, ZID1-ZID8 assigned thereto and the weights thereof GEW. None of the parameters in the georeference data REF has a unit.

The georeference data REF can, as shown in FIG. 2, be stored as a static and/or dynamic list in a storage unit SPR connected to the control means STR and forming part of the road section identifying unit FID. The static list, if present, contains the information provided by the telecommunications carrier concerning the cell IDs ZID, which are received on a toll road section ABS which has already been recognized as a toll road section by the primary localization means. The static list serves as a back-up in case a toll road section ABS has not yet been used during failure of the primary localization means. When the onboard device has classified a traversed road section by means of primary localization as being a toll road section or non-toll road section, the static list is supplemented by a dynamic list. This dynamic list of the georeference data provided by secondary localization contains cell IDs ZID received during usage of toll road sections ABS and additionally the same information as the static georeference data list on toll road sections not being used.

The result of said secondary localization as regards identifying usage of a toll road section is significantly governed by the quality of the georeference data REF provided by said secondary localization. Unlike the georeference data provided by the primary localization system, alterations of the georeference data REF provided by secondary localization can occur at very short notice and have a permanent influence on the quality of the results of said secondary localization: For this reason, if valid data are provided by the primary localization system and a toll road section has been identified, the georeference data provided by the secondary localization system will be adapted to the results of the primary localization.

This adaptation of the georeference data provided by the secondary localization system by the primary localization system takes place on cell IDs, LACs and on the weights by:

(i) upweighting cell IDs received when traveling through a toll road section, and (ii) downweighting cell IDs received when traveling through a non-toll road section.

When an access to a toll road section is unequivocally recognized by the primary localization system, all received cell IDs and the associated LACs can be co-stored until the next access point is recognized. If, when the next access point is recognized, a new road section has in the meantime been paid for and the GPS has not failed for any length of time, the stored cell IDs with their stored LACs are compared with the georeference data provided by the secondary localization system by the following process.

For each of the cell IDs which have been stored in the road section ABS, AB1-AB4 just identified by the primary localization system with reference to received position data KOO, POS1, and POS2 the attempt is made to find the associated road section ABS, AB1-AB4 in the georeference data REF provided by the secondary localization system. One of three cases can occur:

(i) the cell ID ZID, ZID1-ZID9 is already included in the georeference data REF precisely in that toll road section ABS, ABS1-ABS2 which has just been identified by the primary localization system using the position data KOO, POS1, and POS2;

(ii) the cell ID ZID, ZID1-ZID9 is already included in the georeference data REF, but is in another toll road section ABS, ABS1-ABS2; and (iii) the cell ID ZID, ZID1-ZID9 is not yet included in the georeference data REF.

In case (i), the weight GEW of this cell ID ZID, ZID1-ZID9 can be raised (to a maximum corresponding to the number of cells ZE1, ZE2 assigned to the toll road section, for example, 5) and the associated LAC can be registered.

In case (ii), the cell ID ZID, ZID1-ZID9 and the LAC are registered in the georeference data REF in the road section ABS, AB1-AB4 just identified by the primary localization system and the weight GEW of the cell ID ZID, ZID1-ZID9 is initialized with a predefined minimum value, for example, 1. In the road section in the georeference data REF where this cell ID ZID, ZID1-ZID9 had hitherto been present said cell ID is deleted. An exception is given when the road section ABS, AB1-AB4 in the georeference data REF, to which this cell ID ZID, ZID1-ZID9 has previously been assigned, contains fewer cell IDs ZID, ZID1-ZID9 than the road section ABS, AB1-AB4 that has just been identified by the primary localization system. In this case the cell ID ZID, ZID1-ZID9 in this road section is left in the georeference data REF, in order not to lose too much information (this cell ID ZID, ZID1-ZID9 could be the only one in the road section).

In case (iii) the cell ID ZID, ZID1-ZID9 is not found in any road section ABS, AB1-AB4 of the toll road network in the georeference data REF, ie it is a new cell ID ZID, ZID1-ZID9. The cell ID ZID, ZID1-ZID9 and the LAC thereof are registered in that section in the georeference data REF which has just been identified by the primary localization system.

When a cell ID ZID, ZID1-ZID9 has been registered in the complete georeference data REF of a section, this is advantageously done instead of the information concerning where a cell ID ZID, ZID1-ZID9 of lowest weighting is to be found in said road section.

If the primary localization system shows that the vehicle FAR is not in a toll road section, cell IDs ZID, ZID1-ZID9 that have been received and are to be found in a toll road section ABS, AB1-AB4 of the georeference data, can be downweighted. Downweighting can be adjusted, for example, such that the weight GEW of the cell IDs ZID, ZID1-ZID9 which were received on a non-toll road section ABS, AB1-AB4 but which are assigned to a toll road section ABS, AB1-AB4 in the georeference data REF, will be reduced by a predefined value, for example, 2. The minimal weight of each cell ID ZID, ZID1-ZID9 can be restricted to a lower limit, and this limit can be fixed at 1, as mentioned above. If the weight GEW of a cell ID ZID, ZID1-ZID9 is, say, 2, and if this cell ID ZID, ZID1-ZID9 is received on a non-toll road, the weight GEW of this cell ID ZID, ZID1-ZID9 will then be 1 following downweighting.

Road section identification and updating of the dynamic list can be carried out by the control unit STR comprising, for example, an appropriately programmed microprocessor or signal processor. At the end of each run of the road section identification—a new run is initiated whenever a new cell ID ZID, ZID1-ZID9 is received by the transmitter/receiver unit SEE—the entire georeference data REF can be stored for the secondary localization system in a variable, for example, in an array. When road section identification is complete, the information contained in these variables can be transferred to the dynamic list. The dynamic list can be placed, for example in the form of a text file in '.txt' format, in the storage unit SPR of the road section identifying unit FID.

Figure 4:
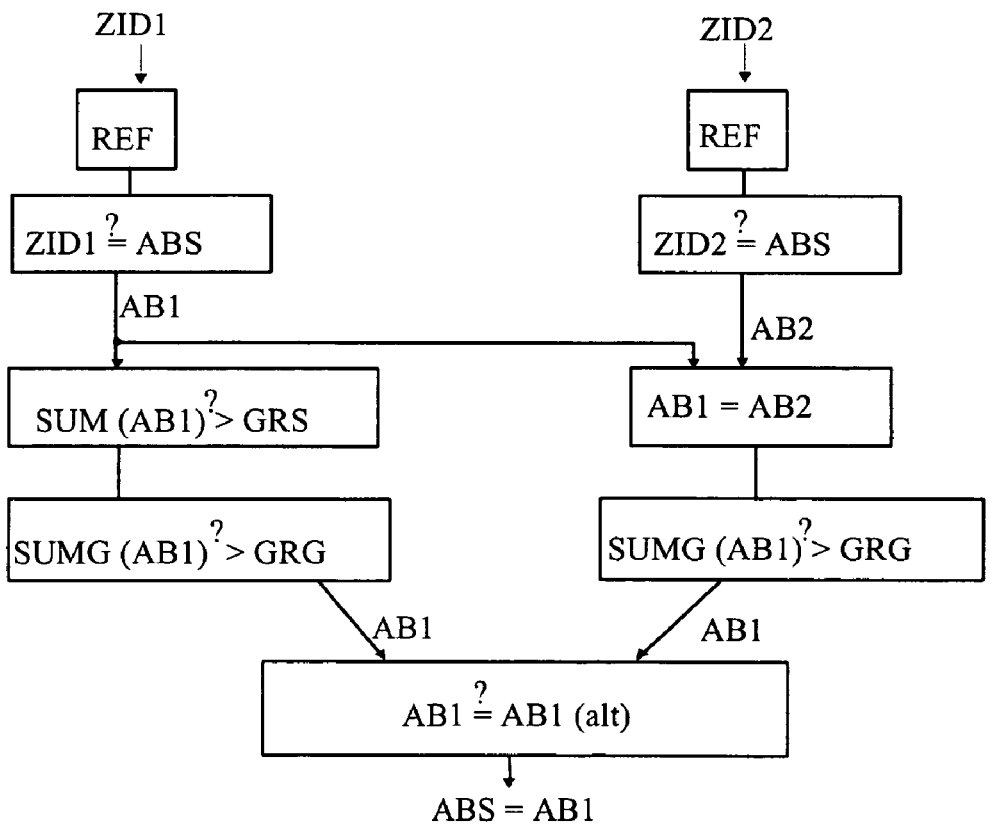
FIG. 4 is a flow chart of the method of the invention.

According to FIG. 4, the determination of a toll road section when there is failure of the primary localization system can be carried out according to the present invention in two steps:

1. comparing the received cell IDs ZID, ZID1-ZID9 with the cell IDs ZID, ZID1-ZID9 present in the georeference data (the dynamic or static list) of the secondary localization system, 2. deciding whether a found toll road section ABS, AB1-AB4 can be stated as having been actually used.

The decision according to the above item 2 as to whether a currently used road section is a toll road section can be made when one or other of the following criteria holds:

(i) more than a minimum number GRS, say 50 percent, of the cell IDs that are assigned in the georeference data to a toll road section ABS, AB1-AB4 have been received (in FIG. 3 the reference characters SUM indicate the number of the cell IDs received in a road section ABS, AB1-AB4), whilst the sum SUMG of the weights GEW of the individual cell IDs ZID, ZID1-ZID9 exceeds a predefined threshold value GRG, or (ii) at least two consecutive cell IDs ZID, ZID1-ZID9 are assigned to the same road section ABS, AB1-AB4 and the sum SUMG of the weights GEW of the two cell IDs ZID, ZID1-ZID9 exceeds a predefined value.

If criterion (i) or criterion (ii) is true, further checks can be made to ascertain whether the identified road section AB1 has already been identified on the same journey. If this is not the case, the identified road section AB1 can then be classified as being a toll road section.

What is claimed is:

1. A method of detecting whether at least one toll road section is being used by a vehicle (FAR), wherein the position of said vehicle (FAR) is determined by means of at least one position calculating system (POS) and the determined position is implemented to ascertain whether the road section being used is a toll road section, and wherein said vehicle (FAR) has a transmitter/receiver unit (SEE) that is adapted to exchange data (DAT) with a cellular radio network (FUN), and to each cell (ZEL) of said radio network (FUN) at least one cell identifier (ZID) is assigned, and when there is at least partial failure of the position calculating system (POS) said at least one cell ID (ZID) is implemented to ascertain whether the road section being used by said vehicle (FAR) is a toll road section, characterized in that each cell assigned to a toll road section is weighted by a weight characteristic of the relevance of said cell for recognition of said toll road section.

2. A method as defined in claim 1, characterized in that at least one cell (ZEL) of the network is assigned to a toll road section.

3. A method as defined in claim 1, characterized in that said cell identifier is transmitted to the transmitter/receiver unit (SEE) of said vehicle (FAR).

4. A method as defined in claim 1, characterized in that said radio network is a GSM network.

5. A method as defined in claim 1, characterized in that said position-calculating system is satellite-aided.

6. A method as defined in claim 5, characterized in that said position-calculating system is a GPS system.

7. A method as defined in claim 1, characterized in that a check is carried out to ascertain whether at least two cell IDs successively received by said transmitter/receiver unit are assigned to the same toll road section.

8. A method as defined in claim 1, characterized in that for identification of a toll road section a sum of the weights of at least two cells assigned to this road section is formed.

9. A method as defined in claim 8, characterized in that when a predefined threshold value of the sum of the weights is exceeded, the currently used road section is classified as being a toll road section.

10. A method as defined in claim 1, characterized in that the weight of a cell is equal to not more than the maximum number of cells assigned to a toll road section.

11. A method as defined in claim 1, characterized in that the number of currently traversed cells assigned to a toll road section is counted with reference to the cell IDs received by said transmitter/receiver unit (SEE), and the count is checked to ascertain whether a predefined number of traversed cells has been exceeded.

12. A toll-collecting system (SYS) comprising at least one position-calculating system (POS) that is adapted to ascertain the position of a vehicle (FAR), which vehicle (FAR) has a road section identifying unit (FID) that is adapted to check, with reference to at least said detected positions, whether the road section being used is a toll road section, wherein said road section identifying unit (FID) has a transmitter/receiver unit (SEE) that is adapted to exchange data (DAT) with a cellular radio network (FUN), and to each cell (ZEL) of said radio network (FUN) at least one cell identifier (ZID) is assigned, and said road section identifying unit (FID) is adapted to check, when there is at least partial failure of said position calculating system (POS), whether the road section being used by said vehicle (FAR) is a toll road section, implementing at least one cell ID (ZID) for this purpose, characterized in that said road section identifying unit (FID) is adapted to weight each cell assigned to a toll road section by a weight characteristic of the relevance of said cell for recognition of said toll road section.

13. A toll-collecting system as defined in claim 12, characterized in that said road section identifying unit is adapted to check whether at least two cell IDs successively received by said transmitter/receiver unit are assigned to the same toll road section.

14. A toll-collecting system as defined in claim 12, characterized in that at least one cell (ZEL) of said radio network (FUN) is assigned a toll road section.

15. A toll-collecting system as defined in claim 12, characterized in that it is adapted to transmit the cell ID to the transmitter/receiver unit (SEE) in said vehicle (FAR).

16. A toll-collecting system as defined in claim 12, characterized in that said radio network is a GSM network.

17. A toll-collecting system as defined in claim 12, characterized in that said position-calculating system (POS) is satellite-aided.

18. A toll-collecting system as defined in claim 17, characterized in that said position-calculating system is a GPS system.

19. A toll-collecting system as defined in claim 12, characterized in that said road section identifying unit (FID) is adapted to count the number of the currently traversed cells assigned to a toll road section by implementing cell IDs received by the transmitter/receiver unit (SEE) and to check whether a predefined number of traversed cells has been exceeded.

20. A toll-collecting system as defined in claim 12, characterized in that the road-identifying unit (FID) is adapted to form, for the purpose of identifying a toll road section, a sum of the weights of at least two cells assigned to said road section.

21. A toll-collecting system as defined in claim 20, characterized in that said road section identifying unit (FID) is adapted to classify the currently used road section as being a toll road section when a predefined threshold value of the sum of the weights is exceeded.

* * * * *